(12) United States Patent
Braun et al.

(10) Patent No.: US 12,517,236 B2
(45) Date of Patent: Jan. 6, 2026

(54) METHOD FOR CALIBRATING A LIDAR SENDOR

(71) Applicants: Mercedes-Benz Group AG, Stuttgart (DE); Robert Bosch GmbH, Stuttgart (DE)

(72) Inventors: Alexander Braun, Ditzingen (DE); Philipp Schindler, Karlsruhe (DE)

(73) Assignees: Mercedes-Benz Group AG, Stuttgart (DE); Robert Bosch GmbH, Stuttgart (DE)

( * ) Notice: Subject to any disclaimer, the term of this patent is extended or adjusted under 35 U.S.C. 154(b) by 822 days.

(21) Appl. No.: 17/760,327

(22) PCT Filed: Jan. 29, 2021

(86) PCT No.: PCT/EP2021/052102
§ 371 (c)(1),
(2) Date: Aug. 8, 2022

(87) PCT Pub. No.: WO2021/160444
PCT Pub. Date: Aug. 19, 2021

(65) Prior Publication Data
US 2023/0076693 A1     Mar. 9, 2023

(30) Foreign Application Priority Data
Feb. 13, 2020   (DE) .................... 10 2020 103 794.5

(51) Int. Cl.
*G01S 7/497*   (2006.01)
*G01S 7/481*   (2006.01)
(Continued)

(52) U.S. Cl.
CPC ............ *G01S 7/497* (2013.01); *G01S 7/4817* (2013.01); *G01S 17/10* (2013.01); *G01S 17/89* (2013.01)

(58) Field of Classification Search
CPC ........ G01S 7/497; G01S 7/4817; G01S 17/10; G01S 17/89; G01S 7/4868; G01S 17/86; G01S 17/931
See application file for complete search history.

(56) References Cited

U.S. PATENT DOCUMENTS 8,767,210 B1 * 7/2014 Lukashin ................. G01J 11/00
356/369
2017/0124781 A1 5/2017 Douillard et al.
(Continued)

FOREIGN PATENT DOCUMENTS

CA      2961921 C  *  5/2020  ............... G06T 7/80
DE      19607345 A1   8/1997
(Continued)

OTHER PUBLICATIONS

Kaasalainen et al. ("Radiometric Calibration of Terrestrial Laser Scanners with External Reference Targets"), 2009.*
(Continued)

*Primary Examiner* — Assres H Woldemaryam
(74) *Attorney, Agent, or Firm* — Marshall & Melhorn, LLC

(57) ABSTRACT

A method for calibrating a lidar sensor of a vehicle or of a robot may include applying laser radiation of the lidar sensor to a reference object in a reference calibration process. The lidar sensor generates a sensor signal, which correlates to the laser radiation and has a reference intensity, and a sensitivity of the lidar receiver being calibrated according to the reference intensity. At least one camera is used to detect whether at least one object having reflectivity corresponding to that of a reference object of the reference calibration process is present in the detection range of the lidar sensor. An intensity of a sensor signal generated on the basis of laser radiation reflected by the object is determined, the determined intensity being compared with an associated refer-
(Continued)

ence intensity and the sensitivity of the lidar receiver being calibrated according to the comparison of the intensity with the reference intensity.

10 Claims, 2 Drawing Sheets

(51) Int. Cl.
*G01S 17/10* (2020.01)
*G01S 17/89* (2020.01)

(56) References Cited

U.S. PATENT DOCUMENTS

| | | | |
|---|---|---|---|
| 2019/0056484 A1* | 2/2019 | Bradley | G01S 7/4815 |
| 2019/0108647 A1* | 4/2019 | Lee | G06F 18/28 |
| 2021/0003682 A1* | 1/2021 | Braley | G06N 3/08 |

FOREIGN PATENT DOCUMENTS

| | | | | |
|---|---|---|---|---|
| DE | 102016009327 A1 | | 2/2017 | |
| WO | WO-2019162296 A1 | * | 8/2019 | ........... G01B 11/275 |
| WO | WO-2021160444 A1 | * | 8/2021 | ........... G01S 17/931 |

OTHER PUBLICATIONS

Dhall et al. ("LIDAR-Camera Calibration using 3D-3D Point correspondences", 2017.*
German Patent and Trademark Office, Office Action in application No. DE 10 2020 103 794.5, dated Oct. 28, 2020, 5 pages, Munchen Germany.
European Patent and Trademark Office, International Search Report and Written Opinion in application No. PCT/EP2021/052102, dated Apr. 8, 2021, 12 pages, Rijswijk, Netherlands.

* cited by examiner

METHOD FOR CALIBRATING A LIDAR SENDOR

BACKGROUND

Field

The invention concerns a method for calibrating a lidar sensor on a vehicle or on a robot.

Background

DE 10 2016 009 327 A1 discloses a method for calibrating a camera on a vehicle, wherein the camera captures images of the vehicle's surroundings. By means of at least one lidar sensor, a defined pattern in the vehicle's surroundings located in at least one section of the camera's detection range is sent out and is captured by the camera. Using an interpretation unit connected to or integrated into the camera, distance values for the patterns contained in the images captured by the camera are measured, and the camera is calibrated based on the distance values. The lidar sensor is configured to be self-calibrating, with the self-calibration based on tracking an object.

In addition, DE 196 07 345 A1 discloses a laser distance measurement device with an impulse laser, a light deflection device, a photo reception array equipped with an optoelectronic photo receiver, and control and interpretation electronics, wherein the impulse laser sends out controlled light pulses and the sequentially transmitted light pulses are linked by the light deflection device at various different angles in a measurement range. Light pulses thrown back by an object located in the measurement range are received by the photo reception array, and the control and interpretation electronics, using the impulse propagation time method applied to the time between sending and receiving a light pulse and based on the speed of light, generate a scanning signal representative of the object's distance from the light deflection device and compensate for propagation time measurement errors caused by the signal dynamics. The control and interpretation electronics include a means of measuring the total electrical load flowing through the photo receiver during reception of a light pulse and of measuring the pulse width of a received light pulse, permitting compensation for any propagation time measurement errors caused by the signal dynamics based on the measured electrical load and pulse width, using the respective correction values. The correction values are generated by the control and interpretation electronics based on loads, pulse widths, and impulse propagation times measured in relation to a reference object generating varying reflectivity levels and placed at a defined distance from the light deflection device. Here the reference object is scanned before and during normal operation of the laser radar.

SUMMARY

The invention is intended to provide a method that improves upon the prior art for calibrating a lidar sensor on a vehicle or on a robot.

The invention achieves this goal by means of the method having the features presented in the claims.

Advantageous embodiments of the invention are the object of the subordinate claims.

In the method according to the invention for calibrating a lidar sensor on a vehicle or on a robot, in a reference calibration, laser radiation from the lidar sensor is applied to a reference object with predetermined reflectivity located at a predetermined distance from the lidar sensor. Laser radiation reflected from the reference object is then received by a lidar receiver on the lidar sensor, and the lidar sensor generates a sensor signal correlated with the laser radiation that has a reference intensity, whereby the sensitivity of the lidar receiver is calibrated based on the reference intensity. For operating calibration, while the vehicle or robot is operating, at least one camera detects whether there is at least one object in the lidar sensor's detection range whose reflectivity corresponds to a reference object for reference calibration. If such an object is present, the lidar sensor measures the distance to the object. In addition, the intensity of a sensor signal generated on the basis of laser radiation reflected by the object is determined, wherein the determined intensity is compared to an associated reference intensity, and the sensitivity of the lidar receiver, a photo detector array, for example, is calibrated based on comparing the intensity to the reference intensity.

The aforementioned robot is configured, for example, as a driving, floating, or resting robot. For example, the robot can also be configured as a vehicle, such as a highly or fully automated passenger car, a highly or fully automated transport vehicle, or a highly or fully automated truck. The robot can also be an industrial robot, automated lawnmower, robot vacuum cleaner, cleaning robot, or automated water vehicle.

For example, based on the calibration, the sensitivity of the lidar receiver and/or the transmission output of the lidar sensor is or are modified in such a way that the lidar receiver sends out a sensor signal which, for the same distance as in the reference calibration, has the same intensity as in the reference calibration. The transmission output and receiver sensitivity are thereby adapted such that an object with known reflectivity is represented the same way by all transmission-reception units of the lidar or when deflected by individual transmission-reception units.

In the example of a calibration surface with a defined Lambertian reflectance of 10%, the same intensity must be generated at a given distance in each section of the lidar's sight range, so that the object can be recognized overall as the same one. Because the intensity of the reflection is distance-dependent, reflectivity is calibrated very frequently. In one concrete application example, the back of a truck often has a polished metal surface bordered by a highly reflective strip. The truck also has taillights and a license plate. Because a lidar does not recognize colors, but instead only backscatter intensities of monochromatic light, the described characteristics of the back of the truck are reflected back in characteristic distributions of intensity or a calibrated reflectivity. These features should be monotone, i.e., scaled the same, in all sections of the lidar's sight range and also across the distance. If the lidar's transmission-reception units now send back differing values, this pattern is changed, which makes the object more difficult for the algorithm to recognize. Similar problems occur if the intensity output of an individual transmission-reception unit oscillates, deflected by a mirror in the sight range, for example. Calibration of the intensity output, and with it the reflectivity derived from it, using the aforementioned method does not have these problems and is therefore essential for reliable lidar object recognition.

In addition to spatial information from lidar detection, algorithms also focus on the intensity of reflections. An object reflects at different strengths depending on its color, material, and orientation, so characteristics can be derived for objects, similar to so-called HOC classifications in cameras. Because lidar often has multiple at least partially independent lasers and lidar receivers that are affected by manufacturing differences, the same object's intensity varies depending upon the laser/receiver combination.

Calibration using objective reference targets during production can correct this, but it is complex and cannot be tested and corrected later during the system's operational life.

The method allows for calibration of the lidar sensor even while the vehicle or robot is in operation. It therefore allows calibration throughout the useful life of the lidar sensor, so that effects of aging, influences of environmental conditions, such as temperature influences, and/or dirt and/or fluctuations or variations of a lidar sensor's power source over time, as well as dynamic changes to a resistor in the lidar sensor's semiconductor, can also be detected. It therefore allows the lidar sensor to be calibrated and adjusted even while it is operating, which is advantageous particularly in automated, especially highly automated, autonomous, or partially autonomous operating vehicles or robots. Calibration makes it possible to then adjust the sensitivity of the lidar receiver and/or transmission output of the lidar sensor to match the sensor signal's intensity adjustment. Because during operation of the vehicle or robot an existing basic calibration can be assumed as the starting point, only a so-called recalibration is necessary for calibration during operation. In that case, for example, the lidar's bounced-back intensity or reflectivity values are overlapped with color and contour interpretations from the camera, so that homogeneous surfaces are identified. The expected intensities are then derived from mean values of the onboard sensors and can also be refined using map data that include information from other vehicles or robots with similar sensor systems, and therefore can provide additional measurement points for the surface.

In addition, the method also allows the camera and lidar sensor to be calibrated relative to each other, so that objects recognized by the camera and the lidar sensor can be better assigned to each other with increased precision. If the camera and lidar sensor are calibrated directly to each other, the relative error between them is reduced. With direct calibration of the camera to the lidar sensor and vice versa generated in this way, direct fusion of raw data from the camera and from the lidar sensor is possible. In addition, fusion of independent data from the camera and the lidar sensor is also improved. The result of referencing the calibration is that the camera and the lidar sensor see the same object in the same place.

Calibrating the lidar sensor's intensity output significantly improves classifier performance and therefore also recognition algorithms. By using the camera that is aboard the vehicle or robot together with the lidar sensor, this process can also be continued throughout the useful life of the lidar sensor, in order to test and also correct the calibration and to compensate for effects of aging. For example, it can take place in an automated, especially highly automated, autonomous, or partially autonomous, operating vehicle or robot when it is parked or connected to a charging station, for example.

In one possible embodiment of the method, while the vehicle or robot is operating at varying distances from the lidar sensor to the object, an intensity is compared to the reference intensity that was generated at a distance that corresponds to the distance from the associated reference object to the lidar sensor. This allows the sensitivity of the 10 lidar receiver and/or the transmission output of the lidar sensor to be controlled such that the intensity of a currently generated sensor signal agrees with the reference intensity, i.e., the deviation between the compared intensities is minimized. In this way, physical characteristics of the lidar receiver can be influenced such that a current intensity of the sensor signal agrees with the reference intensity of the sensor signal that was generated 15 during the previously performed reference calibration for a reference object with the same reflectivity and for the same distance to the object.

In another possible embodiment of the method, while the vehicle or robot is operating at varying distances from the lidar sensor to the object, an intensity is compared to the 20 reference intensity that was generated by extrapolating intensities generated at varying distances from the object to the lidar sensor. This also then allows for reliable calibration of the lidar sensor, if the detected object is not located at the same distance from the lidar sensor as the reference object. In this case, for example, the extrapolated intensity is compared to the reference intensity, and the sensitivity of the lidar receiver and/or the 25 lidar sensor's transmission output is or are controlled such that any deviation between the compared intensities is minimal.

In another possible embodiment of the method, in order to expose the reference object and the object to the laser radiation, the laser radiation sent out by the lidar sensor is deflected by a rotating mirror on the lidar sensor This allows for exceptionally easy and reliable exposure of the reference object to the laser radiation.

In another possible embodiment of the method, the laser radiation directed at the object is infrared laser radiation, so that the reflected laser radiation can be detected using a camera.

In another possible embodiment of the method, when the camera generates detected images, at least during operational calibration, radiation affecting the camera is filtered by an infrared light filter aboard the camera. The infrared light filter reduces interference and increases color quality.

In another possible embodiment of the method, in order to generate images detected by the camera, at least during operational calibration, radiation affecting the camera is filtered by an infrared light filter aboard the camera. The infrared light filter reduces interference and increases color quality.

In another possible embodiment of the method, an infrared light filter is used which, when the camera is in calibration mode, is switched to be permeable by infrared laser radiation that is emitted by the lidar sensor and reflected by the object. This allows the infrared light filter to be used during normal operation of the camera to reduce interference and increase color quality and to be deactivated in calibration mode for optimal detection of the infrared laser radiation that is emitted by the lidar sensor and reflected by the object.

In another possible embodiment of the method, when the object is detected by the camera, multiple sequentially detected images from the camera are integrated. This integration increases the camera's resolution in the infrared range, which is advantageous because a camera configured as a standard color camera has its highest sensitivity in the visible light range and is relatively less sensitive in the infrared range. It also compensates for small fluctuations in illumination. If an individual image from the camera is used and is not integrated at that time, the different illumination times of the camera and the lidar can cause a pulse to appear that generates a rolling shutter effect. By integrating multiple frames at a time, when at a standstill, for example, this rolling shutter effect can be mitigated. It is therefore not important, because of the number of measurements across the frames, when the camera and lidar were started relative to each other and how precisely they run. In particular, the method is also configured so that even constantly scanning sensors can be calibrated, i.e., ranges are not only compared within an image but also with active and inactive lidar between different frames.

Due to the chronological integration, the camera picks up many laser impulses from the lidar, so that synchronization deviations while the camera is capturing the images and an optical pulse from the lidar are also compensated for. The camera therefore detects reflection patterns from the lidar. From the camera's images, the intensity of the reflection patterns can then be determined. Because of the very high resolution of intensity imagers and a high dynamic range, additionally combined, for example, with a process such as High Dynamic Range (HDR), the smallest intensity differences between the various lines can be detected and therefore calibrated at relative intensities in the lidar. These relative intensities are very important for object recognition and similar algorithms, so that objects always have a comparable intensity, regardless of which laser beam is currently hitting them.

In another possible embodiment of the method, the camera is activated to calibrate the lidar sensor in a calibration mode.

In another possible embodiment of the method, the distance to the object is determined based on measuring the elapsed time between the moment when the laser radiation is sent out and the moment when the laser radiation reflected by the object is received. Such a distance determination is very easily and reliably performed and delivers precise results.

DESCRIPTION OF THE FIGURES

Examples of the invention are explained in more detail below, with reference to figures.

The figures show.

DETAILED DESCRIPTION

The same items are marked with the same references in all figures.

Figure 1:
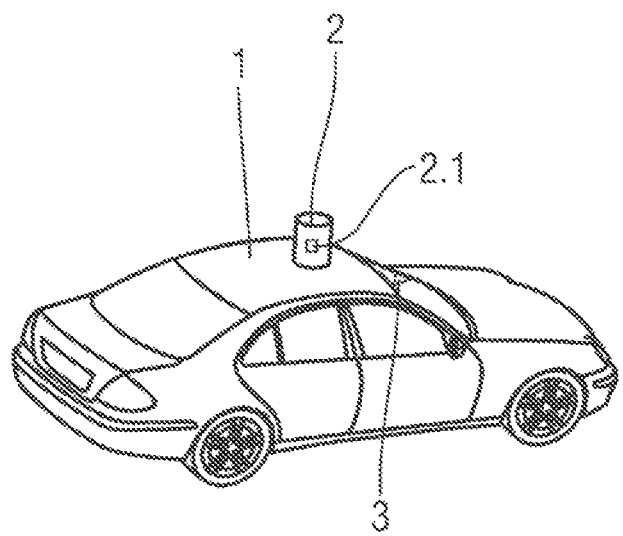
FIG. 1 schematic perspective drawing of a vehicle,
FIG. 2 schematic drawing of a lidar sensor, and
FIG. 3 schematic of the process for operational calibration of a lidar sensor.

FIG. 1 is a perspective drawing of a vehicle 1. The vehicle 1 has a lidar 2 with at least one lidar sensor 2.1 and one camera 3, wherein the lidar 2 and the camera 3 are configured to detect the vehicle's surroundings.

The following explanation can also be applied to robots that have at least one camera 3 and/or at least one lidar sensor 2.1. Such robots are configured, for example, as driving, floating, or resting robots. For example, robots can also be configured as vehicles, such as highly or fully automated passenger cars, as highly or fully automated transport vehicles, or as highly or fully automated trucks. Robots can also be industrial robots, automated lawnmowers, robot vacuum cleaners, cleaning robots, or automated water vehicles.

Figure 2:
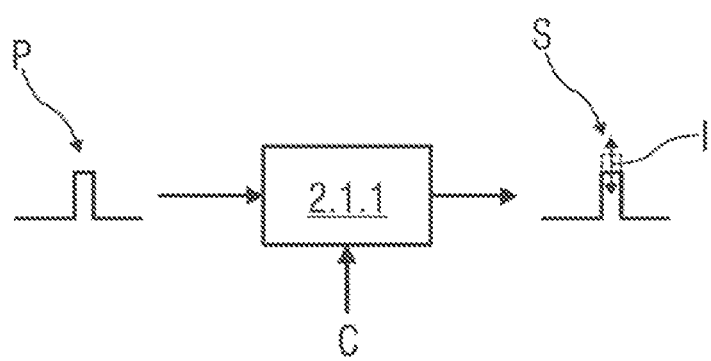

FIG. 2 shows a schematic drawing of a lidar receiver 2.1.1 configured as a photo detector array and for reception of laser radiation, which is part of a lidar sensor 2.1, and illustrates one way in which it functions.

By means of the lidar sensor 2.1, the surroundings of the vehicle 1 is scanned, wherein that scanning is based on sending out infrared laser radiation, in particular infrared laser impulses P, and detecting infrared laser radiation, in particular infrared laser impulses P, reflected back from objects. From the elapsed time between sending an infrared laser impulse P and detecting an infrared laser impulse P, the distance from the lidar sensor 2.1 to the object by which the corresponding infrared laser impulse P was reflected is determined.

The lidar sensor 2.1 has a laser array for sending infrared laser impulses P, a rotating mirror for deflecting the infrared laser impulses P sent out by the laser array over a detection range to be scanned, and the lidar receiver 2.1.1 for detecting the infrared laser impulses P reflected back from objects in the detection range. The lidar receiver 2.1.1 therein converts infrared radiation from the received infrared laser impulses P into corresponding electrical or digital sensor signals S. An intensity I, i.e., an impulse level or impulse amplitude or an integral through the infrared laser impulse P, of the sensor signals S can thereby be varied by controlling the sensitivity of the lidar receiver 2.1.1 and/or the transmission output of the lidar sensor 2.1. In that case, control of sensitivity and/or transmission output can be based on an operating point adjustment, a strengthening adjustment, or digital signal processing and is applied by means of a corresponding control signal C.

Calibration of the lidar sensor 2.1, during vehicle production, for example, is performed at a testing station, for example, and is considered to be a reference calibration. In this process, a reference object with predetermined reflectivity at a predetermined lengthwise spacing or a predetermined distance, i.e., a reference distance, is placed at various positions in the detection range of the lidar sensor 2.1 and reference measurements are taken, at which the infrared laser impulses P reflected back to the lidar receiver 2.1.1 are detected.

Based on the calibration, the sensitivity of the lidar receiver 2.1.1 and/or the transmission output of the lidar sensor 2.1 is/are modified such that the sensor signals S originating from the same reference object at the same reference distance in the same detection range of the lidar sensor 2.1 have the same intensity I. These steps can be repeated at a modified reference distance and/or using additional reference objects with different reflectivity.

However, the sensitivity of the lidar receiver 2.1.1 is dependent upon environmental conditions, such as temperature and/or dirt, as well as the effects of aging. These environmental, dirt-related, or aging effects can cause undesired changes in the intensity I of the sensor signals S. These changes may not be taken into account in the reference calibration.

To prevent undesired changes in the intensity I of the sensor signals S, in addition to the reference calibration an operating calibration is performed while the vehicle 1 is operating.

In the operating calibration, the camera 3 that is mounted on the vehicle 1 for detecting its surroundings is used to calibrate the intensity I of the sensor signals S from the lidar sensor 2.1 during operation of the vehicle 1. This makes it possible to recalibrate the lidar sensor 2.1 while it is operating.

A prerequisite for this is that the intensities I of the sensor signals S, which are determined for the various reference objects and for the various reference distances during the reference calibration, are stored as reference values.

In the operating calibration, the camera 3 is activated in a calibration mode, for example. In this calibration mode, the camera 3 detects whether objects exist in the detection range of the lidar sensor 2.1 that correspond to one of the reference objects based on their reflectivity. This detection is possible using the camera 3 because the camera 3 recognizes colors, and the colors can be used to infer the reflectivity of an object. For example, a white object is strongly reflective, and a black object is weakly reflective.

If the detection performed by the camera 3 indicates that such an object exists, the distance to that object is determined using the lidar sensor 2.1. Then an intensity I of the sensor signal S is determined based on the reflection of an infrared laser impulse P from that object. In addition, the intensity I of the sensor signal S that was determined and stored during reference calibration for the corresponding reference object with the same reflectivity, i.e., a reference intensity, and the associated distance between the reference object and the lidar sensor 2.1 are called up from the storage memory.

This results in the existence of a current measurement value for the intensity I of the sensor signal S as well as an associated stored reference value. These two values can be compared to each other, because they are based on objects with the same reflectivity. However, direct comparison must take into account the fact that the intensity I is dependent upon the object distance, i.e., the distance from the lidar sensor 2.1 to the object or reference object.

For this reason, the lidar sensor 2.1 determines the distance to the object.

Because the distance to the object changes as the vehicle 1 moves, in a first method, if a situation occurs in which the distance to the object is the same as the reference distance, the intensity I of the sensor signal S determined at that distance is compared to the reference intensity called up from the storage memory. The sensitivity of the lidar receiver 2.1.1 and/or the transmission output of the lidar sensor 2.1 is/are then controlled such that the intensity I of the currently determined sensor signal S agrees with the reference intensity, i.e., the deviation between the compared intensities I is minimized. In this case, physical characteristics of the lidar receiver 2.1.1 are affected such that the current intensity I of the sensor signal S agrees with the intensity I of the sensor signal S that was stored during the previous reference calibration for a reference object with the same reflectivity and for the same object distance, i.e., the same distance between the lidar sensor 2.1 and the reference object.

If, during operating calibration, for example, no situation occurs in which the distance to the object is the same as the reference distance, in a second method, based on intensities I of the sensor signal S determined at various object distances, the intensity I that would have been determined at the reference distance can be extrapolated. This extrapolated intensity I is compared to the reference intensity called up from the storage memory, and the sensitivity of the lidar receiver 2.1.1 and/or the transmission output of the lidar sensor 2.1 is/are again controlled such that the deviation between the compared intensities I is minimal.

In this way, based on comparing the intensity I to the reference intensity, the sensitivity of the lidar receiver 2.1.1 is calibrated.

So that the camera 3 can recognize objects in the detection range of the lidar sensor 2.1, it is necessary for the camera 3 to be configured to recognize the reflected infrared laser impulses P. For example, the camera 3 has an infrared light filter to reduce interference and/or increase color quality. This infrared light filter is configured, for example, so that either it is permeable by the reflected infrared light laser impulses P or can be switched in calibration mode tp a status in which it is permeable by the infrared light laser impulses P.

Because the camera is intended for detecting its surroundings, its highest sensitivity is in the visible light range. Its sensitivity in the infrared light range is low. Therefore, to achieve high resolution in the infrared light range, in one possible configuration, measurements from the camera 3 are integrated through multiple images from the camera.

Figure 3:
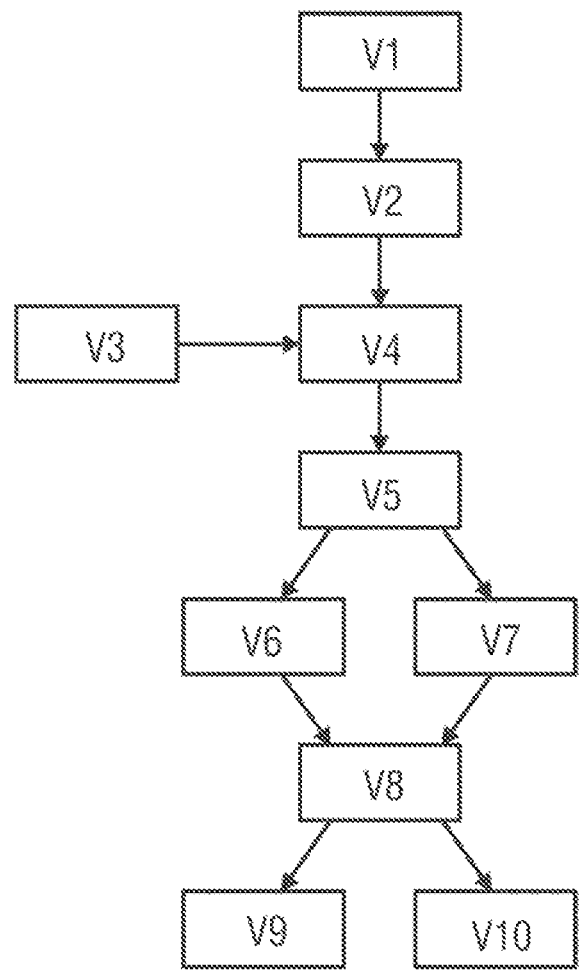

One possible example for performing operating calibration is shown in FIG. 3.

In a first method step V1, the camera 3 and the lidar 2 are activated. The camera 3 here is set in calibration mode, for example.

In a second method step V2, multiple images acquired sequentially by the camera 3, at least ten, for example, are integrated.

In a third method step V3, a so-called Ground Truth is determined, which includes the position, form, and distribution of illumination generated by the lidar 2. For this the vehicle's surroundings are taken into account, which were either recognized during a test stage at the end of the production phase, for example, or determined by means of triangulation, for example, using multiple cameras and a disparity measurement, and/or distance measurement or direct determination by the lidar 2. In addition, high-precision maps can be used to determine the geometry of the surroundings. An expected reflection pattern, i.e., a distribution of the intensity I, again results from a structure in the test stage.

Next, in a fourth method step V4, regions in the images from the camera 3 and frames with detected laser radiation from the lidar sensor 2.1 are determined.

In a method step V5, a white balance and/or a luminescence measurement is/are done.

In a sixth method step V6, a light intensity and a white value are determined intraline by the camera 3 and the lidar 2.

In a sixth method step V7, a light intensity and a white value are determined intraline by the camera 3.

Next, in an eighth method step V8, the light intensities and white values determined in the sixth and seventh method steps V6 and V7 are compared to each other and/or subtracted from each other.

In a ninth method step V9, the interrelated values for the intensity I of the sensor signal S for the lidar sensor 2.1 and the related sensitivity of the camera 3 are stored.

In a tenth method step V10, the settings for the transmission output of the lidar sensor 2.1 and the sensitivity of the lidar receiver 2.1.1 are stored.

LIST OF REFERENCE INDICATORS

1 Vehicle
2 Lidar
2.1 Lidar sensor
2.1.1 Lidar receiver
3 Camera
C Control signal
I Intensity
P Infrared laser impulse
S Sensor signal
V1 to V10 Method steps

The invention claimed is:

1. A method for calibrating a lidar sensor on a vehicle or on a robot, comprising:
during a reference calibration:
laser radiation from the lidar sensor is applied to a reference object with predetermined reflectivity located at a predetermined distance from the lidar sensor,
laser radiation reflected from the reference object is received by a lidar receiver in the lidar sensor,
the lidar sensor generates a sensor signal that correlates with the laser radiation and has a reference intensity, and
a sensitivity of the lidar receiver is calibrated based on the reference intensity, during operating calibration while a vehicle or robot is in operation:
at least one camera detects whether there is at least one object in the detection range of the lidar sensor whose reflectivity corresponds to a reference object for reference calibration,
if such an object is present, the lidar sensor measures the distance to the object,
the intensity of a sensor signal generated based on laser radiation reflected from an object is determined,
the determined intensity is compared to an associated reference intensity, and
based on comparing the intensity to the reference intensity, the sensitivity of the lidar receiver is calibrated.

2. The method as in claim 1, wherein while the vehicle or robot is operating at varying distances from the lidar sensor to the object, an intensity is compared to the reference intensity that was generated at a distance that corresponds to the distance from the associated reference object to the lidar sensor.

3. The method as in claim 1, wherein while the vehicle or robot is operating at varying distances from the lidar sensor to the object, an intensity is compared to the reference intensity that was generated by extrapolation from intensities that were determined at various distances from the lidar sensor to the object.

4. The method as in claim 1, wherein in order to expose the reference object and the object to the laser radiation, the laser radiation sent out by the lidar sensor is deflected by a rotating mirror on the lidar sensor.

5. The method as in claim 1, wherein infrared laser radiation is used as the laser radiation directed at the object.

6. The method as in claim 1, wherein in order to generate images detected by the camera, at least during operational calibration, radiation affecting the camera is filtered by an infrared light filter aboard the camera.

7. The method as in claim 6, wherein
an infrared light filter is used which is permeable by infrared laser radiation emitted by the lidar sensor and reflected by the object, and/or
the infrared light filter, when the camera is in a calibration mode, is switched to be permeable by infrared laser radiation emitted by the lidar sensor and reflected by the object.

8. The method as in claim 6, wherein when the object is detected by the camera, multiple sequentially detected images from the camera are integrated.

9. The method as in claim 6, wherein the camera is switched to a calibration mode for calibrating the lidar sensor.

10. The method as in claim 6, wherein the distance to the object is determined based on measuring the elapsed time between the moment when the laser radiation is sent out and the moment when the laser radiation reflected by the object is received.

* * * * *